(12) United States Patent
Zhu et al.

(10) Patent No.: US 12,253,496 B2
(45) Date of Patent: Mar. 18, 2025

(54) THREE-DIMENSIONAL CONTINUOUS SCANNING LASER VIBROMETRY FOR 3D OR IN-PLANE VIBRATION MEASUREMENTS

(71) Applicant: UNIVERSITY OF MARYLAND, BALTIMORE COUNTY, Baltimore, MD (US)

(72) Inventors: Weidong Zhu, Ellicott City, MD (US); Ke Yuan, Halethorpe, MD (US)

(73) Assignee: UNIVERSITY OF MARYLAND, BALTIMORE COUNTY, Baltimore, MD (US)

( * ) Notice: Subject to any disclaimer, the term of this patent is extended or adjusted under 35 U.S.C. 154(b) by 233 days.

(21) Appl. No.: 18/180,409

(22) Filed: Mar. 8, 2023

(65) Prior Publication Data

US 2023/0304969 A1    Sep. 28, 2023

Related U.S. Application Data

(60) Provisional application No. 63/317,999, filed on Mar. 9, 2022.

(51) Int. Cl.
*G01N 29/24* (2006.01)
*G01N 29/27* (2006.01)
*G01H 9/00* (2006.01)

(52) U.S. Cl.
CPC ......... *G01N 29/2418* (2013.01); *G01N 29/27* (2013.01); *G01H 9/00* (2013.01)

(58) Field of Classification Search
None
See application file for complete search history.

(56) References Cited

U.S. PATENT DOCUMENTS

2003/0189712 A1* 10/2003 Pepper ............... G01H 9/00
356/485

FOREIGN PATENT DOCUMENTS

JP    2002054987 A  *  2/2002

OTHER PUBLICATIONS

Arun et al., Least-squares fitting of two 3-D point sets. IEEE Transactions on Pattern Analysis and Machine Intelligence, PAMI-9 (5), 1987, 698-700.
Chen et al., Damage identification of beams using a continuously scanning laser Doppler vibrometer system. Journal of Vibration and Acoustics, 2016, 138 (5), 051011. 43 pages.
Chen et al., Experimental investigation of notch-type damage identification with a curvature-based method by using a continuously scanning laser doppler vibrometer system. Journal of Nondestructive Evaluation, 2017, 36(2), 38. 1-17.

(Continued)

*Primary Examiner* — Suman K Nath
(74) *Attorney, Agent, or Firm* — Casimir Jones, S.C.; Tristan A. Fuierer

(57) ABSTRACT

The present invention relates to a three-dimensional (3D) continuously scanning laser Doppler vibrometer (CSLDV) system that contains three laser heads with two scan mirrors for each head and a controller, to conduct full-field scanning of a plate-like or beam-like structure under sinusoidal excitations to measure its 3D vibrations and operating deflection shapes, and method of using same.

20 Claims, 5 Drawing Sheets

(56) References Cited

OTHER PUBLICATIONS

Chen et al., Identification of damage in plates using full-field measurement with a continuously scanning laser Doppler vibrometer system. Journal of Sound and Vibration, 2018, 422(1), 542-567.
Chen et al., Investigation of three-dimensional vibration measurement by a single scanning laser Doppler vibrometer. Journal of Sound and Vibration, 387, 2017, 36-52.
Chen et al., Investigation of three-dimensional vibration measurement by three scanning laser Doppler vibrometers in a continuously and synchronously scanning mode. Journal of Sound and Vibration 498, 2021, 115950. 16 pages.
Di Maio et al., Continuous Scanning Laser Vibrometry: A raison d'être and applications to vibration measurements. Mechanical Systems and Signal Processing, Feb. 2021, 156, 107573, 32 pages.
Ewins. Modal Testing: Theory, Practice, and Application, 2nd ed., Research Studies Press Ltd., Hertfordshire, UK. 2000. TOC only. 6 pages.
Halkon et al., Vibration measurements using continuous scanning laser vibrometry: advanced aspects in rotor applications. Mechanical Systems and Signal Processing, 2006, 20(6), 1286-1299.
Halkon et al., Vibration measurements using continuous scanning laser vibrometry: velocity sensitivity model experimental validation. Measurement Science and Technology, 2003, 14(6), 773-783.
Kim et al., 3-D vibration measurement using a single laser scanning vibrometer by moving to three different locations. IEEE Transactions on Instrumentation and Measurement, 2014, 63(8), 2028-2033.
O'Malley et al., Five-axis scanning laser vibrometry for three-dimensional measurements of non-planar surfaces. Measurement Science and Technology, 2009, 20(11), 115901. 1-9.
Stanbridge et al., Modal testing using a scanning laser Doppler vibrometer. Mechanical Systems and Signal Processing, 1999, 13(2), 255-270.
Stoffregen et al., Scanning laser Doppler vibration analysis system. SAE Transactions, 1985, 934-940.
Weekes et al., Multi-frequency, 3D ODS measurement by continuous scan laser Doppler vibrometry. Mechanical Systems and Signal Processing, 2015, 58, 325-339.
Xu et al., Modal parameter estimation using free response measured by a continuously scanning laser Doppler vibrometer system with application to structural damage identification. Journal of Sound and Vibration 485, 2020, 115536. 1-39.
Xu et al., Operational modal analysis of a rectangular plate using non-contact excitation and measurement. Journal of Sound and Vibration, 2013, 332(20), 4927-4939.
Xu et al., Operational modal analysis using lifted continuously scanning laser Doppler vibrometer measurements and its application to baseline-free structural damage identification, Journal of Vibration and Control, 2019, 25 (7), 1341-1364.
Xu et al., Structural damage detection using slopes of longitudinal vibration shapes. Journal of Vibration and Acoustics, 2016, 138(3), 034501. 1-10.
Yuan et al., Estimation of modal parameters of a beam under random excitation using a novel 3D continuously scanning laser Doppler vibrometer system and an extended demodulation method. Mechanical Systems and Signal Processing, 2021, 155, 107606, 16 pages.
Yuan et al., Estimation of modal parameters of a beam under random excitation using a novel 3D continuously scanning laser Doppler vibrometer system and an extended demodulation method. Mechanical Systems and Signal Processing, 2021, 155, 107606. 1-16.
Yuan et al., In-plane operating deflection shape measurement of an aluminum plate using a three-dimensional continyously scanning laser doppler vibrometer system. Experimental Mechanics, 2022, 62: 667-676.
Yuan et al., Modeling of Welded Joints in a Pyramidal Truss Sandwich Panel Using Beam and Shell Finite Elements. J. Vib. Acoust, Aug. 2021, 143(4): 041002, 16 pages.
Zhu et al., A hybrid DIC-EFG method for strain field characterization and stress intensity factor evaluation of a fatigue crack. Measurement, 2020, 154, 107498. 18 pages.

* cited by examiner $f = 3924.3$ Hz $f = 4388.3$ Hz $f = 4778.1$ Hz $f = 4778.1$ Hz

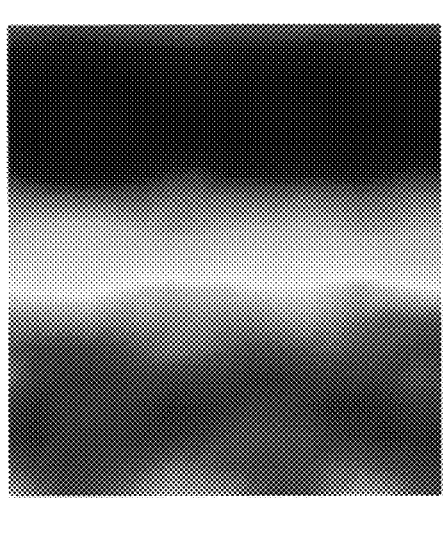
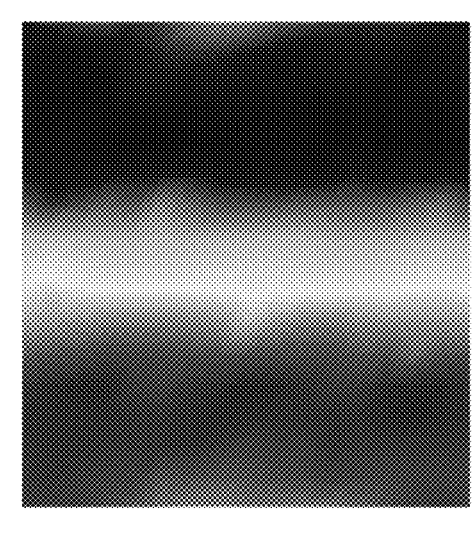
FIGURE 6A                                FIGURE 6B
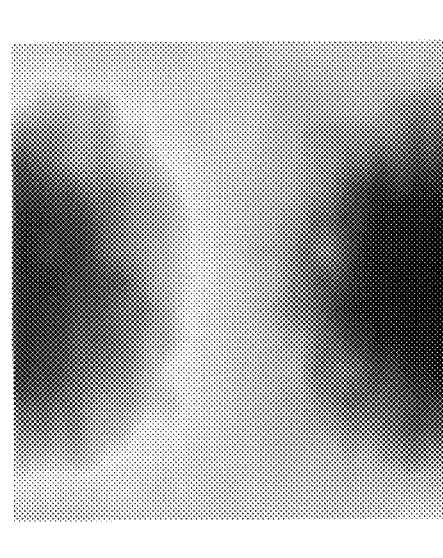
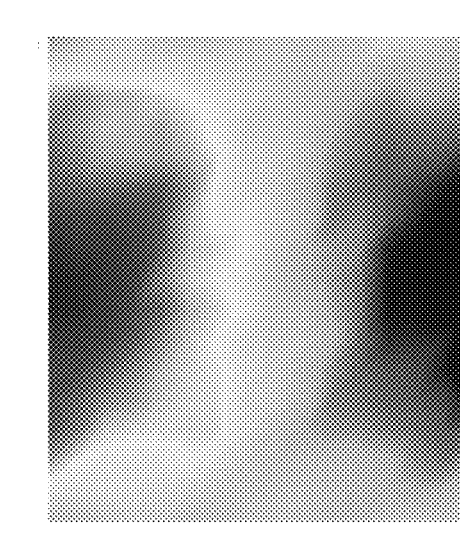
FIGURE 7A                                FIGURE 7B

THREE-DIMENSIONAL CONTINUOUS SCANNING LASER VIBROMETRY FOR 3D OR IN-PLANE VIBRATION MEASUREMENTS

CROSS REFERENCE TO RELATED APPLICATIONS

This application claims priority to U.S. Provisional Patent Application No. 63/317,999 filed on Mar. 9, 2022 in the name of Weidong ZHU et al. entitled "3D CONTINUOUS SCANNING LASER VIBROMETRY FOR 3D OR IN-PLANE VIBRATION MEASUREMENTS," both of which are hereby incorporated by reference herein in their entirety.

STATEMENT OF FEDERALLY SPONSORED RESEARCH

This invention was made with government support under Grant No. CMMI-1763024 awarded by the National Science Foundation. The government has certain rights in the invention.

FIELD

The present invention relates to a method of using three-dimensional (3D) continuous scanning laser vibrometry to measure 3D or in-plane vibrations of structures, and using a conventional demodulation method to estimate natural frequencies and full-field 3D or in-plane operating deflection shapes (ODSs) of structures under sinusoidal excitations. Accurate and dense full-field in-plane ODSs can be obtained in less time, relative to the prior art methods, using a 3D continuous scanning laser vibrometry system.

BACKGROUND

It is known that transverse, or out-of-plane, vibration plays an important role in modal analysis of structures, e.g., plate-like structures or beam-like structures, since their out-of-plane mode shapes are usually found at low natural frequencies and can be easily excited. That said, there is a lack of experimental investigation of in-plane vibration of structures because the usual vibration measurement devices, such as accelerometers and single-point or one-dimensional (1D) scanning laser Doppler vibrometers (LDVs), are designed for measuring vibration normal to the surface of a structure and it is not easy to directly measure in-plane vibration of the structure.

Triaxial accelerometers have been developed and applied to various fields to measure 3D vibrations of structures, but mass loading is still a problem, especially for light-weight structures. To automate a vibration test, a scanning laser Doppler vibrometer (SLDV) was developed by adding a pair of orthogonally mounted galvanometer mirrors to an LDV [Stoffregen et al., 1985]. A 3D SLDV system, which contains three SLDVs and controls three laser spots to synchronously move in a step-wise manner along the surface of a structure, has been developed to measure three perpendicular velocity components of the structure and commercialized as Polytec PSV-400-3D and PSV-500-3D systems. This 3D SLDV system has been applied in many areas, such as vibration analysis of power tools with 3D complex surfaces, identification of fatigue cracks, detection of damage in a beam by using its longitudinal vibration shapes, modal analysis of a whole vehicle body and a tower-like skeletal structure, full-field strain response measurement of an underwater structure, modal testing of a sandwich structure, and modal identification of a three-bladed wind turbine assembly. Some researchers have focused on developing 3D vibration measurement systems by attaching a single SLDV to a multi-axis positioning system [O'Malley et al., 2009] or moving the single SLDV to three different locations to reduce the cost [Kim et al., 2014; Weekes et al., 2015; Chen et al., 2017]. However, it usually takes a long time to obtain high spatial resolution in SLDV measurement when the surface of a structure is large and measurement points are dense, and most previous studies focused on in-plane components of 3D vibrations at relatively low out-of-plane frequencies, which usually have larger magnitudes than those at high in-plane frequencies.

An improved method was previously developed to continuously move the laser spot over the surface of a structure, which was developed as a continuously scanning laser Doppler vibrometer (CSLDV) system [Halkon et al., 2003; Halkon et al., 2006; Di Maio et al., 2021]. For 3D vibration measurements using three CSLDVs, the main challenge is to calibrate positions of the three CSLDVs to continuously and synchronously direct their laser beams along the same scan trajectory. A 3D CSLDV system, which contains three CSLDVs, was developed to address the challenge through a calibrating procedure, and 3D vibrations of a beam or plate under white-noise [Yuan et al., 2021] and sinusoidal [Chen et al., 2021] excitations were studied and showed good agreements with results from a commercial 3D SLDV system. That said, it was still unknown whether the 3D CSLDV system could be used to measure in-plane vibrations of a plate at excitation frequencies close to its in-plane natural frequencies, which are usually much higher than its lowest out-of-plane frequencies, or at any other frequencies, with enough accuracy.

Towards that end, the present invention relates to a zero-contact and fast method of measuring dense full-field in-plane vibrations or operating deflection shapes of a structure, e.g., a plate-like structure or a beam-like structure, at high frequencies and low response magnitudes. The method uses a 3D CSLDV system that contains three laser heads with two scan mirrors for each head and a controller, to conduct full-field scanning of the structure under sinusoidal excitations to measure its 3D vibrations.

SUMMARY

In one aspect, a method of measuring full-field in-plane vibrations of a structure using a three-dimensional (3D) continuous scanning laser Doppler vibrometry (CSLDV) system is described, wherein the 3D CSLDV system comprises three laser heads with two scan mirrors for each head and a controller, said method comprising:
  positioning a first laser head in front of the structure;
  designing a scan trajectory to conduct full-field scanning of the structure;
  using the scan trajectory to determine and adjust the scan mirrors' rotational angles to ensure that three laser spots from the three laser heads can continuously and synchronously move along the same scan trajectory on the structure; and
  exciting the structure along its in-plane directions using at least one excitation frequency and measuring 3D vibrations of the structure.

In some embodiments of the full-field in-plane vibrations measurement method, the structure is a plate-like structure or a beam-like structure.

In some embodiments of the full-field in-plane vibrations measurement method, the first laser head is positioned approximately perpendicular to the structure.

In some embodiments of the full-field in-plane vibrations measurement method, the method further comprises utilizing a demodulation method to process in-plane responses of the structure from 3D CSLDV measurements to obtain its in-plane operating deflection shapes (ODSs) or mode shapes.

In some embodiments of the full-field in-plane vibrations measurement method, the scan trajectory is a zigzag for a plate-like structure.

In some embodiments of the full-field in-plane vibrations measurement method, the scan trajectory is a straight line for a beam-like structure.

In some embodiments of the full-field in-plane vibrations measurement method, the method identifies full-field in-plane ODSs of the structure at high frequencies and low response amplitudes.

In some embodiments of the full-field in-plane vibrations measurement method, a second and a third laser heads are positioned about 30°-60° relative to the first laser head. In some embodiments, the second and third laser heads can cover a complete area to be scanned by the first laser head in the input voltage range.

In some embodiments of the full-field in-plane vibrations measurement method, the demodulation method comprises a conventional demodulation method that processes responses of a structure under sinusoidal excitations.

In some embodiments of the full-field in-plane vibrations measurement method, the method does not require that the three laser spots be pointed to a center of a scan area to effectuate the measurements.

In some embodiments of the full-field in-plane vibrations measurement method, the method further comprises using a reference object as a measurement coordinate system (MCS) to calibrate the 3D CSLDV system, wherein the reference object is positioned parallel to a plane of the structure. In some embodiments, the calibration includes the design of the scan trajectory and the calculation of the rotational angles of the scan mirrors.

In some embodiments of the full-field in-plane vibrations measurement method, the at least one frequency approximates an in-plane natural frequency of the structure or at any frequency.

In some embodiments of the full-field in-plane vibrations measurement method, the structure is excited by sinusoidal excitations.

In some embodiments of the full-field in-plane vibrations measurement method, the method identifies full-field in-plane ODSs of the structure at high frequencies.

In some embodiments of the full-field in-plane vibrations measurement method, the method identifies full-field in-plane ODSs of the structure at low response amplitudes.

In another aspect, a method of measuring ODSs of a structure using a 3D CSLDV system is described, wherein the 3D CSLDV system comprises three laser heads with two scan mirrors for each head and a controller, said method comprising:

positioning a first laser head in front of the structure;

designing a scan trajectory to conduct full-field scanning of the structure;

using the scan trajectory to determine and adjust the scan mirrors' rotational angles to ensure that three laser spots from the three laser heads can continuously and synchronously move along the same scan trajectory on the structure;

exciting the structure along its in-plane directions using at least one excitation frequency and measuring 3D vibrations of the structure; and utilizing a demodulation method to process in-plane responses of the structure from 3D CSLDV measurements to obtain its in-plane ODSs or mode shapes.

In some embodiments of the ODS measurement method, the structure is a plate-like structure or a beam-like structure.

In some embodiments of the ODS measurement method, the first laser head is positioned approximately perpendicular to the structure.

In some embodiments of the ODS measurement method, the scan trajectory is a zigzag for a plate-like structure.

In some embodiments of the ODS measurement method, the scan trajectory is a straight line for a beam-like structure.

In some embodiments of the ODS measurement method, the method identifies full-field in-plane ODSs of the structure at high frequencies and low response amplitudes.

In some embodiments of the ODS measurement method, a second and a third laser heads are positioned about 30°-60° relative to the first laser head. In some embodiments, the second and third laser heads can cover a complete area to be scanned by the first laser head in the input voltage range.

In some embodiments of the ODS measurement method, the demodulation method comprises a conventional demodulation method that processes responses of a structure under sinusoidal excitations.

In some embodiments of the ODS measurement method, the method does not require that the three laser spots be pointed to a center of a scan area to effectuate the measurements.

In some embodiments of the ODS measurement method, the method further comprises using a reference object as a measurement coordinate system (MCS) to calibrate the 3D CSLDV system, wherein the reference object is positioned parallel to a plane of the structure. In some embodiments, the calibration includes the design of the scan trajectory and the calculation of the rotational angles of the scan mirrors.

In some embodiments of the ODS measurement method, the at least one frequency approximates an in-plane natural frequency of the structure or at any frequency.

In some embodiments of the ODS measurement method, the structure is excited by sinusoidal excitations.

In some embodiments of the ODS measurement method, the method identifies full-field in-plane ODSs of the structure at high frequencies.

In some embodiments of the ODS measurement method, the method identifies full-field in-plane ODSs of the structure at low response amplitudes.

In still another aspect, a method of updating a finite element model during design of a structure is described, said method comprising measuring full-field in-plane vibrations or ODSs of the structure using a 3D CSLDV system according to one of the methods described herein.

In yet another aspect, a method of detecting damage in a structure is described, said method comprising measuring full-field in-plane vibrations or ODSs of the structure using a 3D CSLDV system according to one of the methods described herein.

Other aspects, features and embodiments of the invention will be more fully apparent from the ensuing disclosure and appended claims.

BRIEF DESCRIPTION OF THE FIGURES

FIG. 6A. In-plane ODSs along the x direction of the free aluminum plate at the excitation frequency of 4366.4 Hz from 3D CSLDV measurements.

FIG. 6B. In-plane ODSs along the x direction of the free aluminum plate at the excitation frequency of 4366.4 Hz from 3D SLDV measurements.

FIG. 7A. In-plane ODS along the x direction of the free aluminum plate at the excitation frequency of 4715.6 Hz from 3D CSLDV measurements.

FIG. 7B. In-plane ODS along the x direction of the free aluminum plate at the excitation frequency of 4715.6 Hz from 3D SLDV measurements.

DETAILED DESCRIPTION, AND PREFERRED EMBODIMENTS THEREOF

Figure 1A:
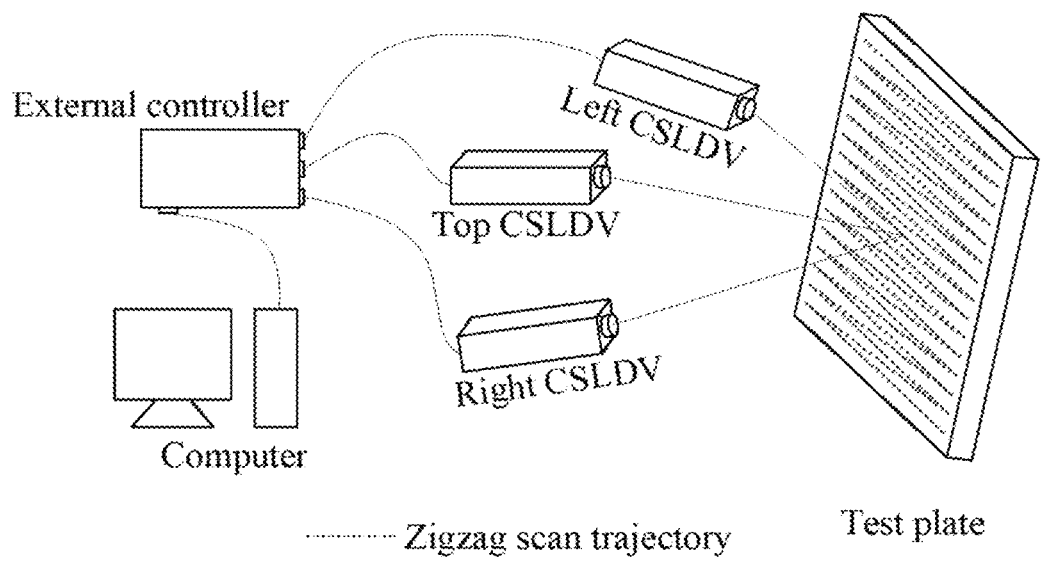
FIG. 1A. Schematic of an embodiment of a three-dimensional (3D) continuous scanning laser vibrometry (CSLDV) system and zigzag scan trajectory for measuring 3D full-field vibrations of a plate.

Although the claimed subject matter will be described in terms of certain embodiments, other embodiments, including embodiments that do not provide all of the benefits and features set forth herein, are within the scope of this disclosure as well. Various structural and parameter changes may be made without departing from the scope of this disclosure.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents, and other references mentioned herein are incorporated by reference in their entirety. The materials, methods, and examples disclosed herein are illustrative only and not intended to be limiting.

"About" and "approximately" are used to provide flexibility to a numerical range endpoint by providing that a given value may be "slightly above" or "slightly below" the endpoint without affecting the desired result, for example, +/−5%.

The phrase "in one embodiment" or "in some embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As defined herein, a "structure" includes, but is not limited to, plate-like structures or beam-like structures. It should be appreciated by the person skilled in the art that a plate-like or beam-like structure comprises a surface residing in the same plane, e.g., an o-xy plane. In other words, the plate-like or beam-like structure has at least one surface that is flat (or has no curvature).

As defined herein, "in-plane" is defined as vibrations along directions parallel to the structure, e.g., plate-like structure.

As defined herein, "full-field" can be defined as vibrations of the whole surface of the plate-like structure or vibrations along the entire beam length of the beam-like structure.

As defined herein, depending on the size and material properties of the structure, "high frequency" can correspond to frequencies in the range of about 4000 Hz to about 10000 Hz.

As defined herein, depending on the size and material properties of the structure, "low frequency" can correspond to frequencies in the range from about 0 Hz to about 1500 Hz.

As defined herein, depending on the size and material properties of the structure, "low response amplitude" can correspond to amplitudes in a range from about 0.1 microns to about 10 microns. "High response amplitudes" can correspond to amplitudes greater than about 1000 microns.

A three-dimensional (3D) continuous scanning laser vibrometry (CSLDV) system was developed to measure 3D full-field vibrations of a structure under sinusoidal excitation at frequencies close to its in-plane natural frequencies, which are identified by a finite element (FE) model and modal test using a scanning laser vibrometry (SLDV) system, e.g., Polytec PSV-500-3D. A scan trajectory, e.g., a two-dimensional (2D) zigzag, was designed on the structure surface to conduct full-field scanning, a shaker was placed at a side of the structure to excite its in-plane vibration, and a reference object parallel to the structure, e.g., plate-like structure plane, was used to calibrate the 3D CSLDV system to ensure that the in-plane vibration can be measured. The difference between the 3D CSLDV system described herein and existing commercial 3D SLDV systems lies in their calibration method. Existing commercial 3D SLDV systems, such as a Polytec PSV-500-3D, calibrate three laser spots by a video triangulation procedure when moving laser spots from one measurement point to the next one, which increases test time and limits its application to continuous scanning. In the present invention, calibration among three laser heads in the 3D CSLDV system based on the geometrical model of its scan mirrors was conducted to adjust their rotational angles to ensure that three laser spots can continuously and synchronously move along the same scan trajectory on the structure. A conventional demodulation method was used to process in-plane response of the structure from 3D CSLDV measurements to obtain its in-plane operating deflection shapes (ODSs). Four obtained in-plane ODSs at three excitation frequencies of the structure from 3D CSLDV measurements are compared to those from 3D SLDV measurements and corresponding in-plane mode shapes from its FE model. Modal assurance criterion (MAC) values between experimental results from 3D CSLDV and commercial 3D SLDV measurements of the structure are larger than 95%, and MAC values between experimental results from its 3D CSLDV measurements and numerical results from its FE model are larger than 91%. Advantageously, the 3D CSLDV system can scan many more measurement points in much less time than the 3D SLDV system.

Accordingly, in a first aspect, a method of measuring full-field in-plane vibrations of a structure using a three-dimensional (3D) continuous scanning laser Doppler vibrometry (CSLDV) system is described, wherein the 3D CSLDV system comprises three laser heads with two scan mirrors for each head and a controller, said method comprising:
  positioning a first laser head in front of the structure;
  designing a scan trajectory to conduct full-field scanning of the structure;
  using the scan trajectory to determine and adjust the scan mirrors' rotational angles to ensure that three laser spots from the three laser heads can continuously and synchronously move along the same scan trajectory on the structure; and
  exciting the structure along its in-plane directions using at least one excitation frequency and measuring 3D vibrations of the structure.

Further, in a second aspect, method of measuring operating deflection shapes (ODSs) of a structure using a three-dimensional (3D) continuous scanning laser Doppler vibrometry (CSLDV) system is described, wherein the 3D CSLDV system comprises three laser heads with two scan mirrors for each head and a controller, said method comprising:
  positioning a first laser head in front of the structure;
  designing a scan trajectory to conduct full-field scanning of the structure;
  using the scan trajectory to determine and adjust the scan mirrors' rotational angles to ensure that three laser spots from the three laser heads can continuously and synchronously move along the same scan trajectory on the structure;
  exciting the structure along its in-plane directions using at least one excitation frequency and measuring 3D vibrations of the structure; and
  utilizing a demodulation method to process in-plane responses of the structure from 3D CSLDV measurements to obtain its in-plane ODSs or mode shapes.

Advantageously, when the excitation frequencies are close to natural frequencies of a structure, the measured operating deflection shapes can approximate the corresponding mode shapes of the structure. Hence, in some embodiments, the method developed in what follows can be used to measure mode shapes of a structure.

Regardless of the aspect, in some embodiments, a conventional demodulation method is used to process responses of a structure under sinusoidal excitation. In other words, an extended demodulation method that processes responses of a structure under random excitation was not used in the methods described herein. In some embodiments, the measurement coordinate system is expressly known and vibrations of in-plane modes of the structure can be measured. This represents an advance over the prior art where the coordinate system was arbitrary and no in-plane modes were measured.

Regardless of the aspect, in some embodiments, full-field in-plane operating deflection shapes (ODSs) of the structure, e.g., plate-like structure, at high frequencies with low response amplitudes can be identified. In some embodiments, full-field in-plane ODSs of the structure, e.g., plate-like structure, at high frequencies can be identified. In some embodiments, full-field in-plane ODSs of the structure, e.g., plate-like structure, with low response amplitudes can be identified. In some embodiments, full-field in-plane ODSs of the structure, e.g., plate-like structure, at frequencies in a range from about 4000 Hz to about 10000 Hz can be identified. In some embodiments, full-field in-plane ODSs of the structure, e.g., plate-like structure, at response amplitudes in a range from about 0.1 microns to about 10 microns can be identified. In some embodiments, full-field in-plane ODSs of the structure, e.g., plate-like structure, at frequencies in a range from about 4000 Hz to about 10000 Hz and at response amplitudes in a range from about 0.1 microns to about 10 microns can be identified. This is a significant advance over the prior art where 3D mode shapes of the beam could be identified only at low frequencies or 3D mode shapes of a structure could only be identified at a limited number of measurement points.

Regardless of the aspect, in some embodiments, with respect to the 3D CSLDV system, at least one laser head is placed in front of, instead of at the side of, the structure during measurement. In some embodiments, the first laser head is placed approximately perpendicular to the plane of the structure during the measurement. In some embodiments, the first laser head is placed 90°±10° relative to the plane of the structure during the measurement. In some embodiments, with respect to the 3D CSLDV system, a second and a third laser head are positioned about 300-600 relative to the first laser head. In some embodiments, the second and third heads can cover a complete area to be scanned by the first laser head in the input voltage range.

Advantageously, the system and methods described herein do not require that the three laser spots be pointed to a center of the scan area.

In a third aspect, a method of updating a finite element model during production design of a structure is described, said method comprising measuring the full-field in-plane vibrations of the structure using a 3D CSLDV system according to the first aspect.

In a fourth aspect, a method of updating a finite element model during design of a structure is described, said method comprising measuring the ODSs of the structure using a 3D CSLDV system according to the method of the second aspect.

In a fifth aspect, a method of detecting damage in a structure, said method comprising measuring the full-field in-plane vibrations of the structure using a 3D CSLDV system according to the method of the first aspect.

In a sixth aspect, a method of detecting damage in a structure, said method comprising measuring the DDSs of the structure using a 3D CSLDV system according to the method of the second aspect.

Example 1

A 3D CSLDV System

Description of a 3D CSLDV System

Figure 1B:
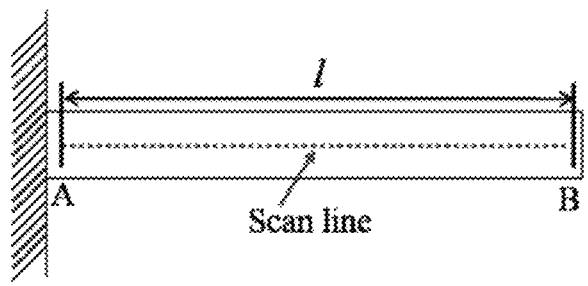
FIG. 1B. Schematic of a line scan for a beam-like structure.

An embodiment of a 3D CSLDV system that comprises three laser heads with two scan mirrors for each head and an controller, can be used to measure 3D full-field vibrations of a structure, for example a plate-like structure. As shown in FIG. 1, three laser heads can be referred to as Top, Left, and Right laser heads based on their positions during measurement. It should be appreciated by the person skilled in the art that the relative positions of the laser heads, i.e., Top, Left and Right, are for the purposes of the proof of concept and are not intended to limit same. A scan trajectory on the surface of the structure is predesigned and corresponding signals are inputted into scan mirrors for each laser head to direct three laser spots to continuously and synchronously move along the scan trajectory. In some embodiments, the predesigned scan trajectory for a plate-like structure is a zig-zag, for example as shown in FIG. 1.

Figure 2:
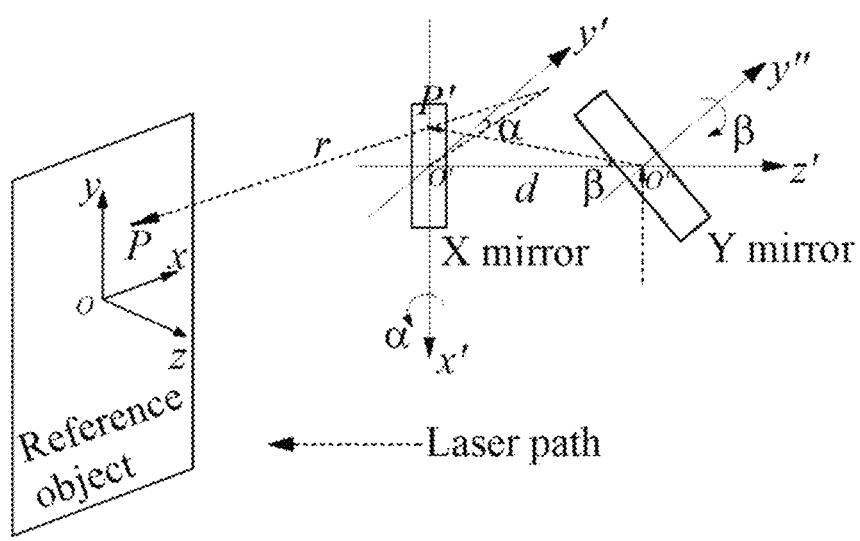
FIG. 2. Geometrical model of X and Y mirrors of a laser head, in which the reference object is used as the measurement coordinate system (MCS) to provide points with known coordinates.
Figure 3A:
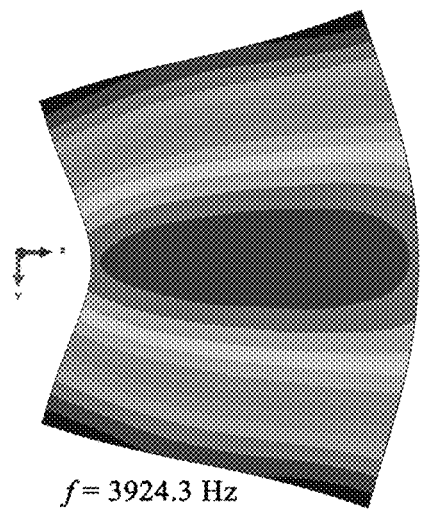
FIG. 3A. Numerical results of in-plane mode shapes of the free aluminum plate along the x direction at a frequency of 3924.3 Hz.
Figure 3B:
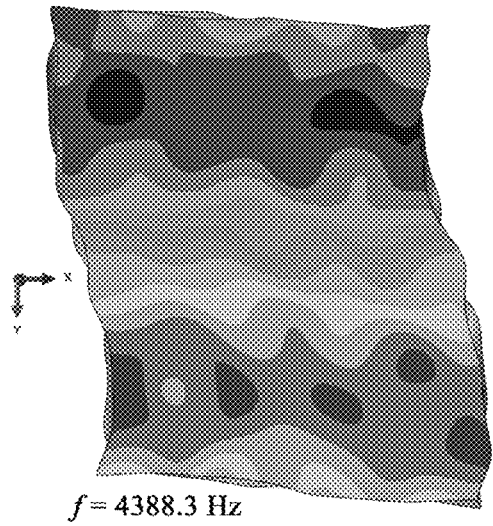
FIG. 3B. Numerical results of in-plane mode shapes of the free aluminum plate along the x direction at a frequency of 4388.3 Hz.
Figure 3C:
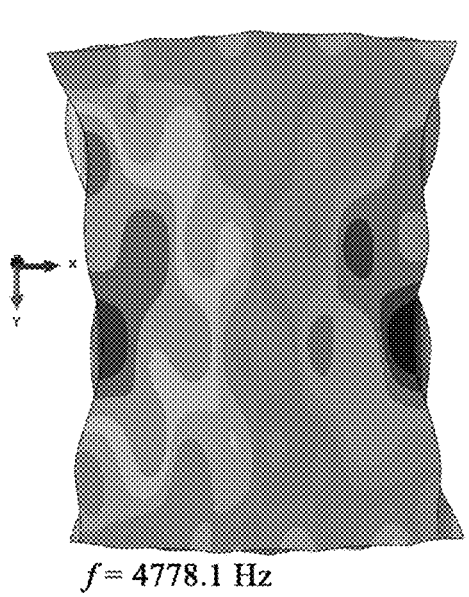
FIG. 3C. Numerical results of in-plane mode shapes of the free aluminum plate along the x direction at a frequency of 4778.1 Hz.
Figure 3D:
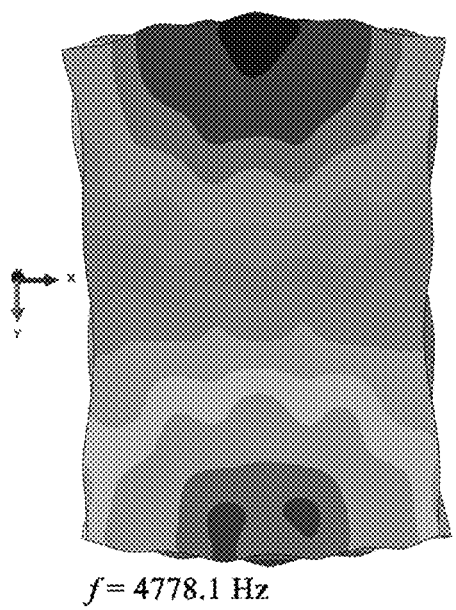
FIG. 3D. Numerical results of in-plane mode shapes of the free aluminum plate along the y direction at the frequency of 4778.1 Hz.

As shown in FIG. 2, a reference object, which has some known accurate coordinates, is used as the measurement coordinate system (MCS) to calibrate the 3D CSLDV system. In some embodiments, the reference object is positioned parallel to the plane of the plate-like structure, so that response measured by three CSLDVs can be projected onto the o-xy plane of the MCS, which includes in-plane ox and oy directions of the plate-like structure. Two orthogonal scan mirrors per laser head, which can be referred to as X and Y mirrors, are used to build the vibrometer coordinate system (VCS) to describe the position of the laser head during measurement. It can be seen from FIG. 2 that the rotating center of the X mirror o' is also the origin of the VCS, and the rotating center of the Y mirror o" is on the o'z' axis; so the X mirror can rotate about the x' axis, and the Y mirror can rotate about the y" axis that is parallel to the y' axis. Variables $\alpha$ and $\beta$, which can be controlled by inputting voltages to X and Y mirrors through the external controller, are rotational angles of X and Y mirrors from their initial positions, respectively. The distance between centers of the two scan mirrors |o'o"|=d is a known parameter for the laser head.

Based on the geometrical model of the laser head in FIG. 2, coordinates of a point P in the VCS can be expressed as $$P_{VCS}=[-d\tan(\beta)-\tau\sin(\beta),-\tau\cos(\alpha)\cos(\beta),-\tau\sin(\alpha)\cos(\beta)]^T, \quad (1)$$

where $\tau$ is the distance from the point P to the incident point of the laser path on the X mirror P'. The unit vector e in the laser beam direction in the VCS can be written as $$e=[\sin(\beta),\cos(\alpha)\cos(\beta),\sin(\alpha)\cos(\beta)]^T, \quad (2)$$

It can be assumed that coordinates of a selected calibrating point P in the MCS are $P_{MCS}=[x, y, z]^T$, whose values can be easily obtained from the reference object. The relation between $P_{MCS}$ and $P_{VCS}$ can be written as $$P_{MCS}=T+RP_{VCS}, \quad (3)$$

where $T=[x_{0'}, y_{0'}, z_{0'}]^T$ is the translation vector that denotes coordinates of the origin o' in the MCS, and R is the direction cosine matrix from the MCS to the VCS. By using the method proposed in Refs. [Yuan et al., 2021; Chen et al., 2021; Arun et al., 1987], which includes procedures of solving an over-determined nonlinear problem and an optimization problem, exact values of $\tau$ for all selected calibrating points, the error of the geometrical unit in the Top laser head, and T and R matrices for each laser head can be calculated. In some embodiments, using six points including four corner points and one reference point on either of two poles on the reference object were selected as reference points, which ensures that all the reference points are not on the same plane.

In some embodiments, a zigzag scan trajectory is used in CSLDV measurements of plate-like structures. In some embodiments, alternative trajectories, for example trajectories that are more conductive to covering the shape of the structure, are used in the CSLDV measurements, as readily understood by the person skilled in the art. In some embodiments, if the structure is a beam-like structure, the scan trajectory is a line (see, e.g., FIG. 1B). For the 3D CSLDV system described in this example, the first step to design the zigzag scan trajectory is to calculate values of r for all measurement points along the scan trajectory. Since the plate-like structure is flat, the bisection method proposed and used to design a one-dimensional (1D) scan line on a beam in Yuan and Zhu (2021), which is referred to as the iteration method there, can be extended to design a 2D scan trajectory on a plate-like structure by repeating the same process for multiple lines. Based on the fact that coordinates of a measurement point $P^k$ are constant in the MCS for three laser heads, positional relations among three laser heads for the point can be established by $$T_{Top}+R_{Top}P_{VCS(Top)}{}^k=T_{Left}+R_{Left}P_{VCS(Left)}{}^k+T_{Right}+R_{Right}P_{VCS(Right)}{}^k, \quad (4)$$

where subscripts Top, Left, and Right denote the Top, Left, and Right laser heads, respectively, and the superscript k denotes the k-th measurement point on the scan trajectory. Hence, coordinates of the point $P^k$ in VCSs of Left and Right laser heads can be obtained by $$P_{VCS(Left)}{}^k=R_{Left}^{-1}[(T_{top}-T_{Left})+R_{top}P_{VCS(Top)}{}^k], \quad (5)$$

$$P_{VCS(Right)}{}^k=R_{right}^{-1}[(T_{Top}-T_{Right})+R_{Top}P_{VCS(Top)}{}^k], \quad (6)$$

respectively. Therefore, rotational angles of X and Y mirrors of Left and Right laser heads for the point $P^k$ can be obtained by $$\alpha_{Left}{}^k=\arctan(z_{VCS(Left)}{}^k/y_{VCS(Left)}{}^k)$$
$$\beta_{Left}{}^k=\arctan(x_{VCS(Left)}{}^k/(y_{VCS(Left)}{}^k)/\cos(\alpha_{Left}{}^k)-d)), \quad (7)$$

and $$\alpha_{Right}{}^k=\arctan(z_{VCS(Right)}{}^k/y_{VCS(Right)}{}^k)$$
$$\beta_{Right}{}^k=\arctan(x_{VCS(Right)}{}^k/(y_{VCS(Right)}{}^k)/\cos(\alpha_{Right}{}^k)-d)), \quad (8)$$

respectively.

With the methodology described above, three laser spots from three laser heads can continuously and synchronously move along the same scan trajectory by inputting corresponding rotational angles to their scan mirrors. Vibration components of the point $P^k$ in x, y, and z directions of the MCS can then be obtained by $$[V_x^k, V_y^k, V_z^k]^T=[[R_{Top}e_{Top}{}^k, R_{Left}e_{Left}{}^k, R_{Right}e_{Right}{}^k]^T]^{-1}[V_{Top}{}^k, V_{Left}{}^k, V_{Right}{}^k]^T, \quad (9)$$

where $V_{Top}{}^k, V_{Left}{}^k$, and $V_{Right}{}^k$ are measured velocities of the point $P^k$ by using Top, Left, and Right laser heads, respectively. The process described by Eq. (9) can be repeated for each point on the prescribed scan trajectory. Finally, 3D vibrations of the plate-like structure in the MCS can be obtained by the 3D CSLDV system.

Demodulation Method

A demodulation method can be used to process the steady-state response of a structure under sinusoid excitation from CSLDV measurement to obtain its ODS at the excitation frequency [Stanbridge et al., 1999]. The steady-state response along the scan trajectory u can be expressed as $$u(x,t)=U(x)\cos(\omega t-\varphi)=U_I(x)\cos(\omega t)+U_Q(x)\sin(\omega t), \quad (10)$$

where x denotes position information of measurement points along the scan trajectory, U(x) are responses at measurement points along the scan trajectory that have two components, which are the in-phase component $U_I$ (x) and quadrature component $U_Q$ (x), $\omega$ is the excitation frequency, and $\varphi$ is a phase variable. To obtain in-phase and quadrature components of U(x), multiplying u (x,t) by cos($\omega$t) and sin($\omega$t) yields $$u(x, t)\cos(\omega t) = \Phi_I(x)\cos^2(\omega t) + \Phi_Q(x)\sin(\omega t)\cos(\omega t) \quad (11)$$
$$= \frac{1}{2}\Phi_I(x) + \frac{1}{2}\Phi_I(x)\cos(2\omega t) + \frac{1}{2}\Phi_Q(x)\sin(2\omega t),$$

and $$u(x, t)\sin(\omega t) = \Phi_I(x)\sin(\omega t)\cos(\omega t) + \Phi_Q(x)\sin^2(\omega t) \quad (12)$$
$$= \frac{1}{2}\Phi_Q(x) + \frac{1}{2}\Phi_I(x)\sin(2\omega t) - \frac{1}{2}\Phi_Q(x)\cos(2\omega t),$$

respectively. A low-pass filter can then be used to eliminate sin(2$\omega$t) and cos(2$\omega$t) terms in Eqs. (11) and (12), and corresponding results can be multiplied by a scale factor of two to obtain $U_I$ (x) and $U_Q$ (x).

Experimental Setup

A rectangular aluminum plate, which has dimensions of 400 mm×500 mm×4.75 mm, was used as the specimen to mimic a plate-like structure, for this proof of concept experiment. Three laser heads from a Polytec PSV-500-3D SLDV system were used to build the 3D CSLDV system described herein. The Polytec PSV-500-3D system has no continuously scanning function, but has the interface connector in each SLDV, which can be connected to an external controller. A dSPACE MicroLabBox and the ControlDesk software were used as the external controller to generate a series of signals to control a total number of six scan mirrors to continuously rotate in the configured 3D CSLDV system. The external controller can be removed from the 3D CSLDV system to obtain the original Polytec PSV-500-3D system and conduct step-wise scanning measurements. In some embodiments, the longitudinal axis of the Top laser head is approximately perpendicular to the scan surface of the plate-like structure. In some embodiments, the longitudinal axis of the Top laser head is 90°±10° relative to the scan surface of the plate-like structure. In some embodiments, Left and Right laser heads can be placed at locations about 30° to about 60° relative to the Top laser head and their laser spots can cover the complete area to be scanned in the input voltage range. A reference object, e.g., Polytec PSV-A-450, parallel to the plate-like structure was used to calibrate the 3D CSLDV system. Two strings were used to hang the plate-like structure to simulate its free boundary conditions in the o-xy plane, and a shaker was placed at one side of the plate-like structure to excite it along its in-plane directions by using frequencies that are close to in-plane natural frequencies of the plate-like structure. The shaker can be arranged to excite the plate-like structure along the x direction, and the plate-like structure can rotate about the oz axis by 90° in the o-xy plane when measuring its ODSs along the y direction. In-plane ODSs at frequencies close to identified natural frequencies of the plate-like structure were obtained in the 3D step-wise scanning manner of the Polytec PSV-500-3D system in the same MCS and used as references for comparison purposes to validate in-plane ODSs obtained from 3D CSLDV measurements.

Numerical Model of the Plate-like Structure

A FE model of the plate-like structure with free boundary conditions was created using the commercial finite element software ABAQUS to obtain its theoretical natural frequencies and mode shapes. The material of the FE model of the plate-like structure is aluminum that has a Young's modulus of 70 GPa, a density of 2750 kg/m³, and a Poisson's ratio of 0.33. As shown in FIGS. 3A-3D, three in-plane natural frequencies of the plate-like structure can be calculated in the frequency range from 0 to 5000 Hz. It can be seen that mode shapes at natural frequencies of 3924.3 Hz and 4388.3 Hz are in-plane shear modes along the x direction, and the mode shape at the natural frequency of 4788.1 Hz is an in-plane longitudinal mode that has components along both x and y directions.

Experimental Procedure and Results

Figure 4:
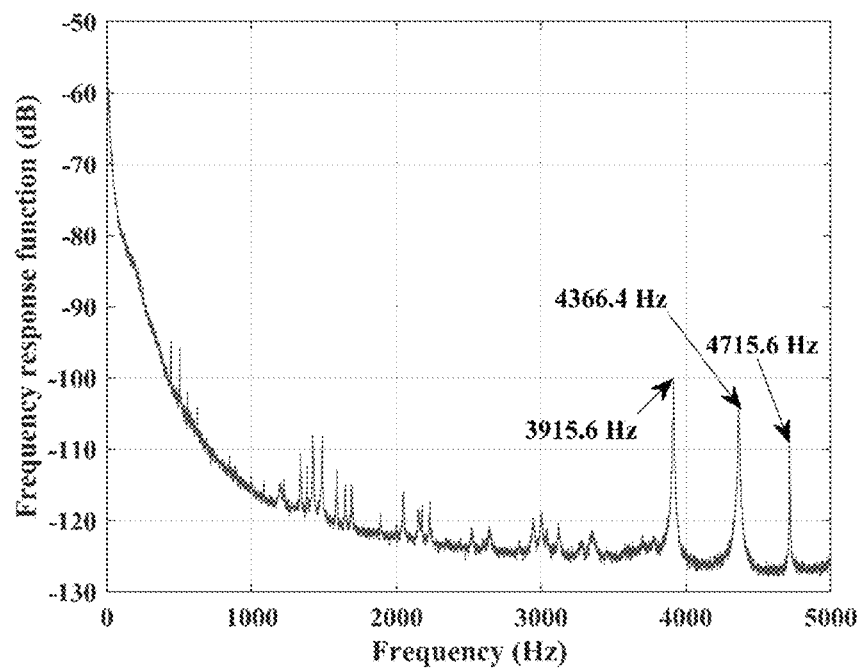
FIG. 4. Summed in-plane frequency response functions of all the 289 measurement points from the modal test by using the 3D SLDV system.
Figure 5A:
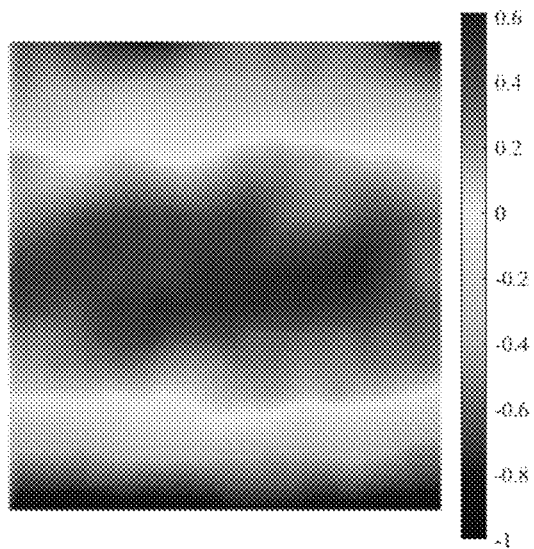
FIG. 5A. In-plane operating deflection shapes (ODSs) along the x direction of the free aluminum plate at the excitation frequency of 3915.6 Hz from 3D CSLDV measurements.
Figure 5B:
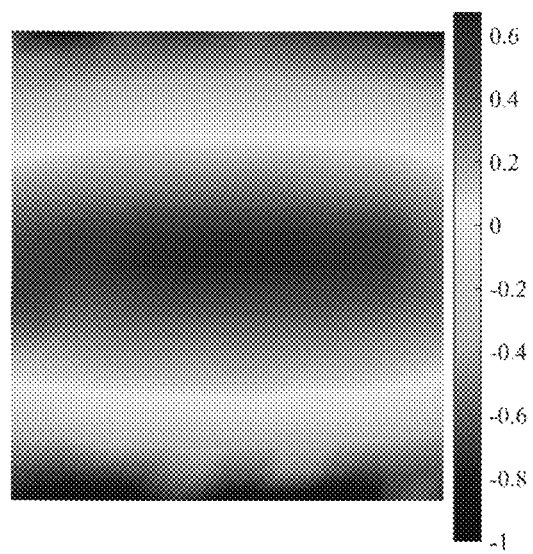
FIG. 5B. In-plane ODSs along the x direction of the free aluminum plate at the excitation frequency of 3915.6 Hz from 3D scanning laser vibrometry (SLDV) measurements.
Figure 8A:
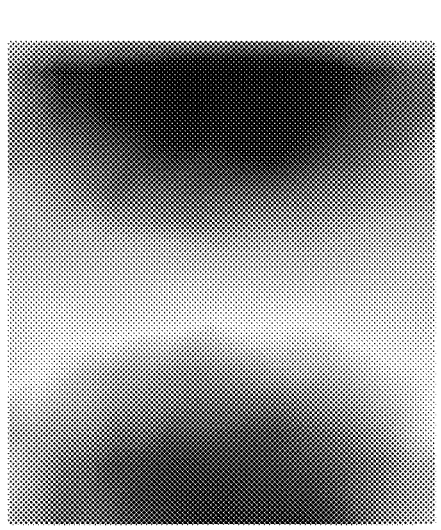
FIG. 8A. In-plane ODS along the y direction of the free aluminum plate at the excitation frequency of 4715.6 Hz from 3D CSLDV measurements.
Figure 8B:
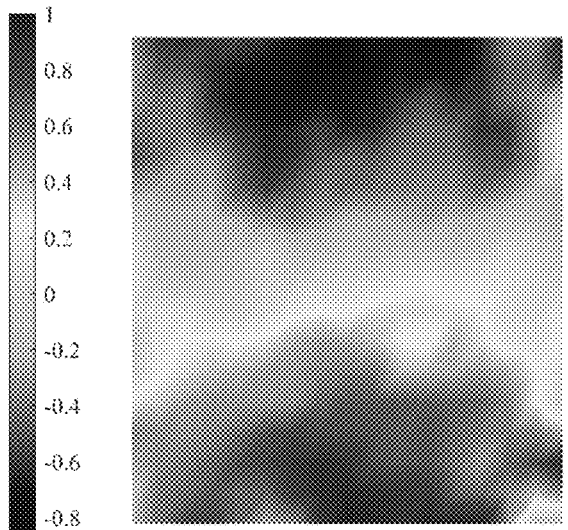
FIG. 8B. In-plane ODS along the y direction of the free aluminum plate at the excitation frequency of 4715.6 Hz from 3D SLDV measurements.

A modal test was first conducted using the Polytec PSV-500-3D system in its step-wise scanning mode to identify in-plane natural frequencies of the plate-like structure, where a sweeping signal with a frequency band from 0 to 5000 Hz was used as excitation. A total number of 289 measurement points were selected in the modal test, which formed a 17×17 grid on the plate-like structure. The summed in-plane frequency response functions (FRFs) of all the 289 measurement points is shown in FIG. 4 where in-plane natural frequencies of the plate-like structure are marked. The first three in-plane natural frequencies of the plate-like structure identified from the modal test are shown in Table 1 and compared to those from its FE model. It can be seen that the maximum error between the first three in-plane natural frequencies from the modal test of the plate-like structure and its FE model is 1.3%, indicating that these identified in-plane natural frequencies of the plate-like structure are accurate and can be used as excitation frequencies to obtain corresponding in-plane ODSs. The ratio of the largest measured in-plane rigid-body natural frequency of the plate-like structure to its first in-plane elastic natural frequency is 0.4%, which is less than 10%, indicating that boundary conditions simulated by the strings in this experiment can be considered as free boundary conditions [Ewins, 2000]. Note that some relatively low frequencies at peaks in FIG. 4 are natural frequencies of out-of-plane mode shapes of the plate-like structure.

TABLE 1

Natural frequencies of the first three in-plane mode shapes of the free plate-like structure from its FE model and the modal test by using the 3D SLDV system, and corresponding errors between them.

| In-plane mode number | Natural frequency (Hz) | | Error (%) |
|---|---|---|---|
| | FE model | Modal test | |
| Mode 1 | 3924.3 | 3915.6 | 0.2 |
| Mode 2 | 4388.3 | 4366.4 | 0.5 |
| Mode 3 | 4778.1 | 4715.6 | 1.3 |

A detailed description for calculating rotational angles of scan mirrors in Left and Right laser heads and calibrating the 3D CSLDV system is provided below:

1. Control scan mirrors in three laser heads to successively direct their laser spots to six reference points on a reference object, e.g., the PSV-A-450 reference object, record their coordinates in the MCS and corresponding rotational angles, and obtain translation vectors and direction cosine matrices of the three laser heads.
2. Design a zigzag scan trajectory on the test plate-like structure, record rotational angles of scan mirrors in the Top laser head for start and end points on each scan line, and measure distances from the Top laser head to the start and end points.
3. Use Eqs. (4)-(8) to calculate rotational angles of scan mirrors corresponding to Left and Right laser heads.
4. Feed signals corresponding to rotational angles calculated in the above steps to three laser heads, and visually examine if three laser spots can continuously and synchronously move along the same scan line.

In some embodiments, if the three laser heads are not moved between structure measurements, calibration does not need to be performed before the measurement of each new structure. In other words, in some embodiments, calibration only needs to be performed if the position of at least one laser head is changed. That said, calibration can be performed for every measurement, even if the three laser heads are not moved, if desired.

In some embodiments, to ensure laser spots continuously move along the whole zigzag scan trajectory, they are designed to move through one scan line n times, where n is an odd whole number. For example, when the scan frequency of the 3D CSLDV system is $f_{sc}=1$ Hz, which means that it takes 0.5 s to move laser spots through one scan line, and the sampling frequency of the system is $f_{sa}=50,000$ Hz, 50,000 data points are sampled in 1 s. The full-field zigzag scan trajectory on the plate-like structure in this example includes 34 scan lines and n is set to 5. Therefore, the total time to complete the whole scanning is $t=0.5\times5\times33=82.5$ s and the total number of measurement points is $k=0.5\times50000\times33=825,000$. Comparison of the total scanning time and number of measurement points between the 3D CSLDV system and 3D SLDV system is shown in Table 2. It can be seen that the 3D CSLDV system described herein can measure many more points almost 15 times more quickly than the 3D SLDV system in full-field vibration measurement.

TABLE 2

Comparison between test times and numbers of measurement points of 3D CSLDV and 3D SLDV measurements.

| Measurement method | Test time (s) | Number of measurement points |
|---|---|---|
| 3D CSLDV measurement | 82.5 | 25,000 × 33 = 825,000 |
| 3D SLDV measurement | 1,200 | 17 × 17 = 289 |

Results of four in-plane ODSs of the free plate-like structure at three excitation frequencies from both 3D CSLDV and 3D SLDV measurements are shown in FIGS. 5-8. Note that the coordinate system in said figures is the same as that in the FE model of the plate-like structure, where the x axis is along the horizontal direction and they axis is along the vertical direction. In-plane ODSs at frequencies of 3915.6 Hz and 4366.4 Hz are shear ones along the x direction, and those at the frequency of 4715.6 Hz are longitudinal ones along both x and y directions, which have similar patterns to corresponding mode shapes in FIGS. 3A-3D from the FE model of the plate-like structure.

To further check correlations between in-plane ODSs of the plate-like structure from 3D CSLDV measurements and in-plane mode shapes from its FE model, and those between in-plane ODSs of the plate-like structure from 3D CSLDV and 3D SLDV measurements, MAC values are calculated and shown in Table 3. It can be seen that correlation is high when a MAC value is close to 1 and low when it is close to zero [Ewins, 2000]. One can see that MAC values between in-plane ODSs from 3D CSLDV and 3D SLDV measurements are larger than 95% for all the four modes, indicating that 3D CSLDV measurements in this example have the same accuracy as that of 3D SLDV measurements. MAC values between in-plane ODSs from 3D SLDV measurements and in-plane mode shapes from the FE model of the plate-like structure are larger than 89% for all the four modes. MAC values between in-plane ODSs from 3D CSLDV measurements and in-plane mode shapes from the FE model of the plate-like structure are larger than 91% for all the four modes. Without being bound by theory, it is assumed that the possible reason for the slightly lower MAC value of mode 3 along the x direction is that the mode shape from the FE model at the frequency of 4788.1 Hz is a coupled mode shape that has components along both x and y directions, but is dominated by the component along the y direction.

TABLE 3

MAC values between in-plane ODSs of the plate-like structure from 3D CSLDV measurements and in-plane mode shapes from its FE model, and those between in-plane ODSs of the plate-like structure from 3D CSLDV and 3D SLDV measurements

| Mode number | MAC values between 3D SLDV measurement and the FE model (%) | MAC values between 3D CSLDV measurement and the FE model (%) | MAC values between 3D CSLDV and 3D SLDV measurements (%) |
|---|---|---|---|
| Mode 1 | 98.0 | 97.9 | 96.3 |
| Mode 2 | 98.1 | 97.1 | 98.4 |
| Mode 3 (x) | 89.3 | 91.5 | 96.7 |
| Mode 3 (y) | 93.8 | 95.8 | 97.1 |

Conclusion

A method of measuring 3D or in-plane vibrations of structures using a 3D CSLDV system is described herein, which permits the obtainment of 3D full-field in-plane vibrations of a structure, e.g., a plate-like structure, under sinusoidal excitations at frequencies close to its in-plane natural frequencies. A scan trajectory, e.g., 2D zigzag, was designed on the plate-like structure surface to conduct a full-field scanning, a shaker was placed at a side of the plate-like structure to excite its in-plane vibrations, and a reference object parallel to the plate-like structure was used to calibrate the 3D CSLDV system to ensure that in-plane vibrations can be measured. A demodulation method was used to process response of the plate-like structure from 3D CSLDV measurements to obtain its full-field in-plane ODSs. In the frequency range from 0-5000 Hz, four obtained in-plane ODSs of the plate-like structure at three excitation frequencies from 3D CSLDV measurements are compared to those from 3D SLDV measurements and corresponding in-plane mode shapes from its FE model. MAC values between experimental results from 3D CSLDV and 3D SLDV measurements are larger than 95%, and MAC values between experimental results from 3D CSLDV measurements and numerical results from the FE model of the plate-like structure are larger than 91%, indicating that 3D CSLDV measurements in this study have the same accuracy as that from 3D SLDV measurements. The 3D SLDV system can measure 289 measurement points in 1,200 s, while the 3D CSLDV system can measure 825,000 measurement points in 82.5 s, which means that the 3D CSLDV system is much faster and provides a more accurate and much dense measurement than the 3D SLDV system in full-field vibration measurement.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

REFERENCES

Arun, K. S., Huang, T. S., and Blostein, S. D. (1987). Least-squares fitting of two 3-D point sets. IEEE Transactions on pattern analysis and machine intelligence, (5), 698-700.

Chen, D. M., and Zhu, W. D. (2017). Investigation of three-dimensional vibration measurement by a single scanning laser Doppler vibrometer. Journal of Sound and Vibration, 387, 36-52.

Chen, D. M., and Zhu, W. D. (2021). Investigation of three-dimensional vibration measurement by three scanning laser Doppler vibrometers in a continuously and synchronously scanning mode. Journal of Sound and Vibration, 498, 115950.

Di Maio, D., Castellini, P., Martarelli, M., Rothberg, S., Allen, M. S., Zhu, W. D., and Ewins, D. J. (2021). Continuous Scanning Laser Vibrometry: A raison d'être and applications to vibration measurements. Mechanical Systems and Signal Processing, 156, 107573.

Ewins, D. J. (2000). Modal Testing: Theory, Practice, and Application, 2nd ed., Research Studies Press Ltd., Hertfordshire, UK.

Halkon, B. J., Frizzel, S. R., and Rothberg, S. J. (2003). Vibration measurements using continuous scanning laser vibrometry: velocity sensitivity model experimental validation. Measurement Science and Technology, 14(6), 773.

Halkon, B. J., and Rothberg, S. J. (2006). Vibration measurements using continuous scanning laser vibrometry: advanced aspects in rotor applications. Mechanical systems and signal processing, 20(6), 1286-1299.

Kim, D., Song, H., Khalil, H., Lee, J., Wang, S., and Park, K. (2014). 3-D vibration measurement using a single laser scanning vibrometer by moving to three different locations. IEEE transactions on instrumentation and measurement, 63(8), 2028-2033.

O'Malley, P., Woods, T., Judge, J., and Vignola, J. (2009). Five-axis scanning laser vibrometry for three-dimensional measurements of non-planar surfaces. Measurement Science and Technology, 20(11), 115901.

Stanbridge, A. B., and Ewins, D. J. (1999). Modal testing using a scanning laser Doppler vibrometer. Mechanical systems and signal processing, 13(2), 255-270.

Stoffregen, B., and Felske, A. (1985). Scanning laser Doppler vibration analysis system. SAE Transactions, 934-940.

Weekes, B., and Ewins, D. (2015). Multi-frequency, 3D ODS measurement by continuous scan laser Doppler vibrometry. Mechanical Systems and Signal Processing, 58, 325-339.

Yuan, K., and Zhu, W. D. (2021). Estimation of modal parameters of a beam under random excitation using a novel 3D continuously scanning laser Doppler vibrometer system and an extended demodulation method. Mechanical Systems and Signal Processing, 155, 107606.

What is claimed is:

1. A method of measuring full-field in-plane vibrations of a structure using a three-dimensional (3D) continuous scanning laser Doppler vibrometry (CSLDV) system, wherein the 3D CSLDV system comprises three laser heads with two scan mirrors for each head and a controller, said method comprising:
    positioning a first laser head in front of the structure;
    designing a scan trajectory to conduct fill-field scanning of the structure;
    using the scan trajectory to determine and adjust the scan mirrors' rotational angles to ensure that three laser spots from the three laser heads can continuously and synchronously move along the same scan trajectory on the structure; and
    exciting the structure along its in-plane directions using at least one excitation frequency and measuring 3D vibrations of the structure.

2. The method of claim 1, wherein the structure is a plate-like structure or a beam-like structure.

3. The method of claim 1, wherein the first laser head is positioned approximately perpendicular to the structure.

4. The method of claim 1, further comprising utilizing a demodulation method to process in-plane responses of the structure from 3D CSLDV measurements to obtain its in-plane operating deflection shapes (ODSs) or mode shapes.

5. The method of claim 1, wherein the scan trajectory is a zigzag for a plate-like structure.

6. The method of claim 1, wherein the scan trajectory is a straight line for a beam-like structure.

7. The method of claim 1, wherein the method identifies fill-field in-plane ODSs of the structure at high frequencies and low response amplitudes.

8. The method of claim 1, wherein a second laser head and a third laser head are positioned about 30°-60° relative to the first laser head.

9. The method of claim 8, wherein the second and third laser heads can cover a complete area to be scanned by the first laser head in the input voltage range.

10. The method of claim 4, wherein the demodulation method comprises a conventional demodulation method that processes responses of a structure under sinusoidal excitations.

11. The method of claim 1, wherein the method does not require that the three laser spots be pointed to a center of a scan area to effectuate the measurements.

12. The method of claim 1, further comprising using a reference object as a measurement coordinate system (MCS) to calibrate the 3D CSLDV system, wherein the reference object is positioned parallel to a plane of the structure.

13. The method of claim 12, wherein the calibration includes the design of the scan trajectory and the calculation of the rotational angles of the scan mirrors.

14. The method of claim 1, wherein the at least one frequency approximates an in-plane natural frequency of the structure or at any frequency.

15. The method of claim 1, wherein the structure is excited by sinusoidal excitations.

16. The method of claim 1, wherein the method identifies full-field in-plane ODSs of the structure at high frequencies.

17. The method of claim 1, wherein the method identifies in-plane ODSs of the structure at low response amplitudes.

18. A method of updating a finite element model during design of a structure, said method comprising measuring full-field in-plane vibrations of the structure using a 3D CSLDV system according to the method of claim 1.

19. A method of detecting damage in a structure, said method comprising measuring full-field in-plane vibrations of the structure using a 3D CSLDV system according to the method of claim 1.

20. A method of measuring operating deflection shapes (ODSs) of a structure using a three-dimensional (3D) continuous scanning laser Doppler vibrometry (CSLDV) system, wherein the 3D CSLDV system comprises three laser heads with two scan mirrors for each head and a controller, said method comprising:
    positioning a first laser head in front of the structure;
    designing a scan trajectory to conduct full-field scanning of the structure;
    using the scan trajectory to determine and adjust the scan mirrors' rotational angles to ensure that three laser spots from the three laser heads can continuously and synchronously move along the same scan trajectory on the structure;
    exciting the structure along its in-plane directions using at least one excitation frequency and measuring 3D vibrations of the structure; and
    utilizing a demodulation method to process in-plane responses of the structure from 3D CSLDV measurements to obtain its in-plane ODSs or mode shapes.

* * * * *

UNITED STATES PATENT AND TRADEMARK OFFICE
CERTIFICATE OF CORRECTION

PATENT NO. : 12,253,496 B2
APPLICATION NO. : 18/180409
DATED : March 18, 2025
INVENTOR(S) : Weidong Zhu and Ke Yuan Page 1 of 1

It is certified that error appears in the above-identified patent and that said Letters Patent is hereby corrected as shown below:

In the Claims

Column 16, Claim 1, Line 25 should read:
- designing a scan trajectory to conduct full-field scanning -

Column 16, Claim 7, Line 49 should read:
- full-field in-plane ODSs of the structure at high frequencies and low response amplitudes -

Column 17, Claim 17, Line 13 should read:
- full-field in-plane ODSs of the structure at high frequencies -

Signed and Sealed this
Sixth Day of May, 2025

Coke Morgan Stewart
*Acting Director of the United States Patent and Trademark Office*